US012647547B2

(12) United States Patent
Chinnaiyan et al.

(10) Patent No.: US 12,647,547 B2
(45) Date of Patent: *Jun. 2, 2026

(54) SYSTEMS AND METHODS FOR PROVIDING PUNCHOUTS OF VIDEOS

(71) Applicant: GoPro, Inc., San Mateo, CA (US)

(72) Inventors: Anandhakumar Chinnaiyan, Fremont, CA (US); Ravi Kumar Belagutti Shivanandappa, Sunnyvale, CA (US); Jonathan Leland Thorn, San Leandro, CA (US); Nicholas Ryan Gilmour, San Jose, CA (US); Clark Weber, Mill Valley, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,497

(22) Filed: Aug. 16, 2024

(65) Prior Publication Data

US 2024/0414292 A1     Dec. 12, 2024

Related U.S. Application Data

(63) Continuation of application No. 17/871,721, filed on Jul. 22, 2022, now Pat. No. 12,069,223, which is a continuation of application No. 17/140,365, filed on Jan. 4, 2021, now Pat. No. 11,399,169, which is a continuation of application No. 16/786,922, filed on Feb. 10, 2020, now Pat. No. 10,887,570, which is a (Continued)

(51) Int. Cl.
H04N 5/262 (2006.01)
G06T 7/20 (2017.01)

G06V 40/16 (2022.01)
H04N 13/111 (2018.01)
H04N 21/431 (2011.01)
H04N 21/47 (2011.01)
H04N 23/698 (2023.01)

(52) U.S. Cl.
CPC .............. *H04N 13/111* (2018.05); *G06T 7/20* (2013.01); *G06V 40/161* (2022.01); *H04N 5/2628* (2013.01); *H04N 21/4316* (2013.01); *H04N 21/47* (2013.01); *H04N 23/698* (2023.01); *G06T 2207/10016* (2013.01)

(58) Field of Classification Search
CPC .... H04N 21/47; H04N 5/2628; H04N 23/698; H04N 21/4316; H04N 13/111; G06V 40/161; G06V 20/49; G11B 27/031; G06T 7/20; G06T 2207/10016
See application file for complete search history.

(56) References Cited

U.S. PATENT DOCUMENTS 10,043,552 B1 * 8/2018 Martin ................. H04N 23/698
10,248,866 B1 4/2019 Cotoros
(Continued)

*Primary Examiner* — Tsion B Owens
(74) *Attorney, Agent, or Firm* — Esplin & Associates, PC

(57) ABSTRACT

Multiple punchouts of a video may be presented based on multiple viewing windows. The video may include visual content having a field of view. Multiple viewing windows may be determined for the video, with individual viewing window defining a set of extents of the visual content. Different punchouts of the visual content may be presented based on the different viewing windows. Individual punchout of the visual content may include the set of extents of the visual content defined by corresponding viewing window.

20 Claims, 10 Drawing Sheets spherical visual content 300 yaw axis 310 pitch axis 320 roll axis 330

Related U.S. Application Data continuation of application No. 16/227,444, filed on Dec. 20, 2018, now Pat. No. 10,587,855.

(56)                    References Cited

U.S. PATENT DOCUMENTS

| | | | | |
|---|---|---|---|---|
| 10,262,691 | B1 | 4/2019 | Gilmour | |
| 10,587,855 | B1 | 3/2020 | Chinnaiyan | |
| 10,674,205 | B2 * | 6/2020 | Gupta | H04N 21/458 |
| 10,687,039 | B1 * | 6/2020 | Vaden | H04N 23/685 |
| 10,887,570 | B2 | 1/2021 | Chinnaiyan | |
| 11,399,169 | B2 | 7/2022 | Chinnaiyan | |
| 12,069,223 | B2 | 8/2024 | Chinnaiyan | |
| 2015/0082364 | A1 | 3/2015 | Jayaram | |
| 2017/0084086 | A1 | 3/2017 | Pio | |
| 2017/0142480 | A1 * | 5/2017 | Gupta | H04N 13/167 |
| 2018/0115706 | A1 | 4/2018 | Kang | |
| 2019/0289204 | A1 * | 9/2019 | Oddy | G11B 27/031 |
| 2020/0204778 | A1 | 6/2020 | Chinnaiyan | |
| 2021/0127104 | A1 | 4/2021 | Chinnaiyan | |
| 2022/0377303 | A1 | 11/2022 | Chinnaiyan | |

* cited by examiner

System 10

METHOD 200

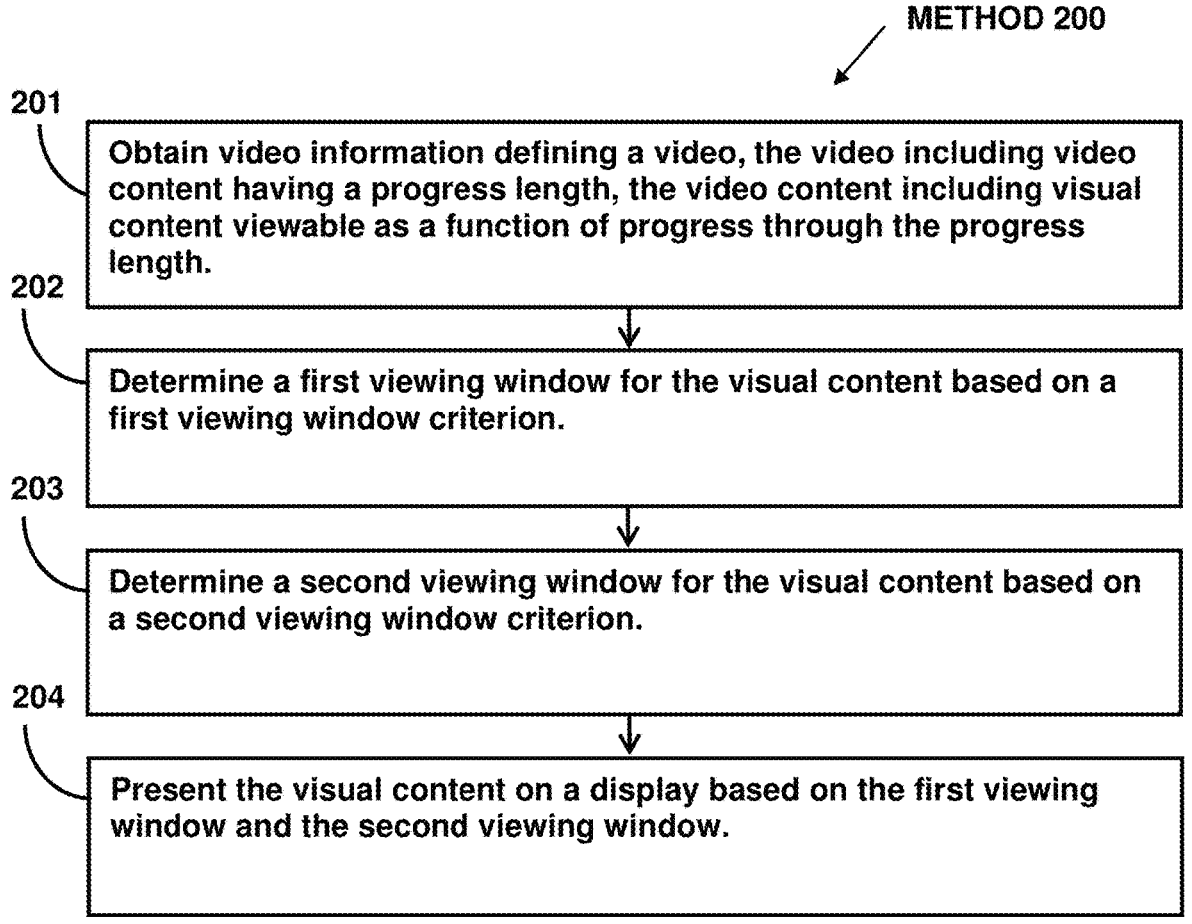

201

Obtain video information defining a video, the video including video content having a progress length, the video content including visual content viewable as a function of progress through the progress length.

202

Determine a first viewing window for the visual content based on a first viewing window criterion.

203

Determine a second viewing window for the visual content based on a second viewing window criterion.

204

Present the visual content on a display based on the first viewing window and the second viewing window.

FIG. 2 spherical visual content 300 yaw axis 310 pitch axis 320 roll axis 330

FIG. 5A                                    FIG. 5B viewing window A 836
viewing window B 838
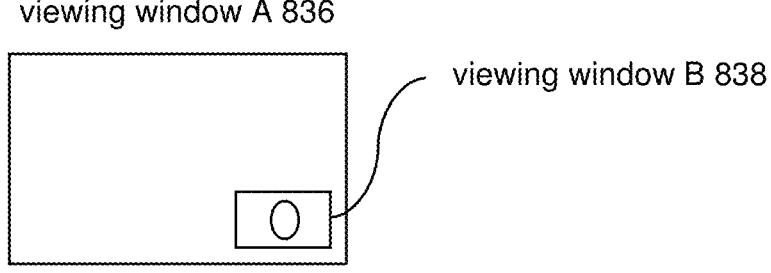
Image capture device 804
person 802
direction B
818
direction A
816
motion direction 808
movement platform 806
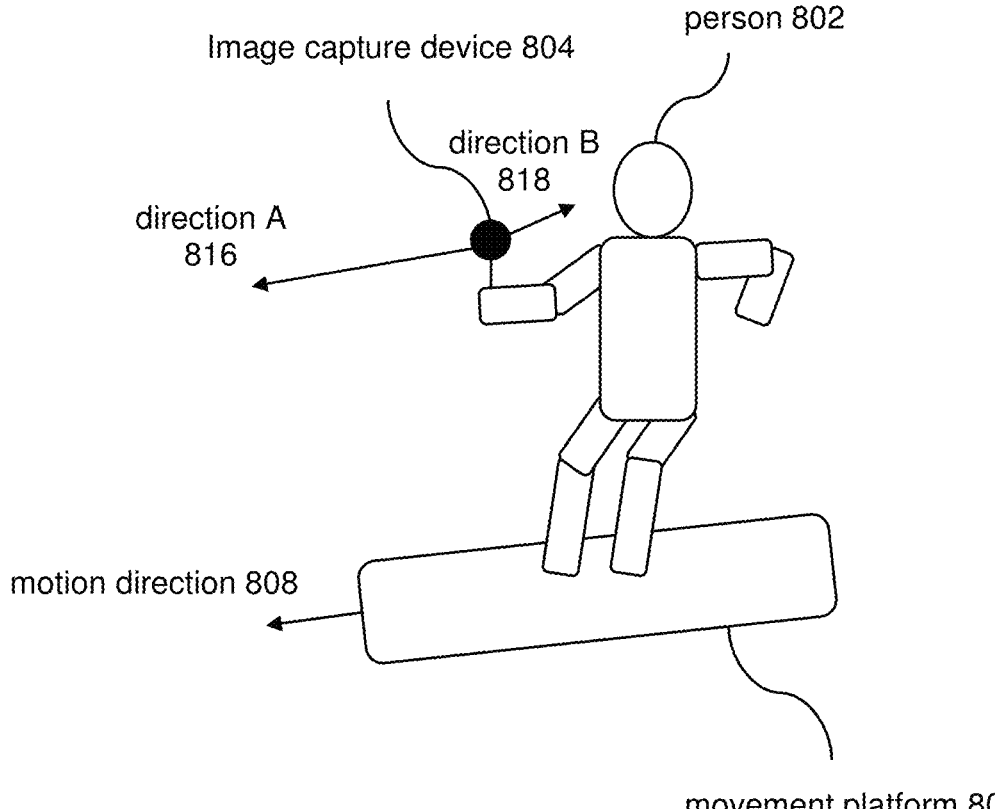
FIG. 8

SYSTEMS AND METHODS FOR PROVIDING PUNCHOUTS OF VIDEOS

FIELD

This disclosure relates to providing punchouts of videos.

BACKGROUND

A video may include greater visual capture of one or more scenes, objects, and/or activities than may be viewed at a time. Determining which portion(s) of the video should be viewed may be difficult and time consuming.

SUMMARY

This disclosure relates to providing punchouts of videos. Video information defining a video may be obtained. The video may include video content having a progress length. The video content may include visual content viewable as a function of progress through the progress length. The visual content having a field of view. A first viewing window for the visual content may be determined based on a first viewing window criterion and/or other information. A second viewing window for the visual content may be determined based on a second viewing window criterion and/or other information. The first viewing window may define a first set of extents of the visual content, and the second viewing window may define a second set of extents of the visual content. The visual content may be presented on a display based on the first viewing window and the second viewing window. The presentation of the visual content may include a first punchout of the visual content based on the first viewing window and a second punchout of the visual content based on the second viewing window.

A system that provides punchouts of videos may include one or more electronic storage, processor and/or other components. The electronic storage may store video information defining videos, information relating to videos, information relating to viewing window criterion, information relating to viewing windows, information relating to punchouts of visual content, information relating to video presentation, and/or other information.

The processor(s) may be configured by machine-readable instructions. Executing the machine-readable instructions may cause the processor(s) to facilitate providing punchouts of videos. The machine-readable instructions may include one or more computer program components. The computer program components may include one or more of a video information component, a viewing window component, a presentation component, and/or other computer program components.

The video information component may be configured to obtain video information and/or other information. Video information may define a video. The video information component may obtain video information from one or more storage locations. The video information component may obtain video information during acquisition of the video and/or after acquisition of the video by one or more image capture devices.

The video may include video content having a progress length. The video content may include visual content viewable as a function of progress through the progress length. The visual content may have a field of view.

In some implementations, the video may include a spherical video. The spherical video may define the visual content viewable from a point of view as the function of progress through the progress length. The field of view may include a spherical field of view. The field of view may be extracted from 360-degrees or a sphere.

In some implementations, the visual content may be divided into multiple parts. For example, the visual content may be divided into a first hemisphere and a second hemisphere opposite the first hemisphere.

The viewing window component may be configured to determine multiple viewing windows for the visual content. The viewing window may be used to provide punchouts of the visual content. The viewing window component may determine a first viewing window for the visual content based on a first viewing window criterion and/or other information. The first viewing window may define a first set of extents of the visual content. The viewing window component may determine a second viewing window for the visual content based on a second viewing window criterion and/or other information. The second viewing window may define a second set of extents of the visual content.

In some implementations, the first criterion may include a direction detection criterion. The determination of the first viewing window based on the direction detection criterion may include selection of the first set of extents of the visual content based on a direction of motion of an image capture device or an object carrying the image capture device during capture of the visual content. The selection of the first set of extents of the visual content based on the direction of motion may include selection of a viewing direction for the first viewing window to follow the direction of motion. The second criterion may include a face detection criterion. The determination of the second viewing window based on the face detection criterion may include selection of the second set of extents of the visual content based on detection of a closest face to the image capture device during capture of the visual content.

In some implementations, the first criterion may include a first subject detection criterion and the second criterion may include a second subject detection criterion. The determination of the first viewing window based on the first subject detection criterion may include selection of the first set of extents of the visual content to include a first framing of a first subject within a first punchout of the visual content. The determination of the second viewing window based on the second subject detection criterion may include selection of the second set of extents of the visual content to include a second framing of a second subject within a second punchout of the visual content.

The second framing of the second subject may be determined based on the first framing of the first subject such that the second framing of the second subject is equivalent to the first framing of the first subject. The second framing of the second subject being equivalent to the first framing of the first subject may include the first punchout of the visual content and the second punchout of the visual content appearing to include the first subject and the second subject captured from a same distance or from a same angle.

The presentation component may be configured to present the visual content on a display based on multiple viewing windows and/or other information. For example, the presentation component may present the visual content on a display based on the first viewing window, the second viewing window, and/or other information. Such presentation of the visual content may include different punchouts of the visual content based on different viewing windows. For example, the presentation of the visual content based on the first viewing window and the second viewing window may include a first punchout of the visual content based on the first viewing window and a second punchout of the visual content based on the second viewing window. In some implementations, the presentation of the visual content based on a viewing window may include playback of one or more portions of the audio content. The portion(s) of the audio content included in the playback may be selected based on spatiality or directionality of the audio content (e.g., selecting portion of the audio content originating from an audio source within the viewing window).

In some implementations, individual punchout of the visual content may include the set of extents of the visual content defined by corresponding viewing window. For example, the first punchout of the visual content may include the extent(s) of the visual content defined by the first viewing window and the second punchout of the visual content may include the extent(s) of the visual defined by the second viewing window.

In some implementations, the visual content may be divided into a first hemisphere and a second hemisphere opposite the first hemisphere. The presentation of the punchouts of the visual content may include stitching of the visual content or may not include stitching of the visual content. For example, the first punchout of the visual content may include a first portion of the visual content within the first hemisphere and the second punchout of the visual content may include a second portion of the visual content within the second hemisphere, and the first punchout and the second punchout of the visual content may be presented without stitching of the visual content divided within the first hemisphere and the second hemisphere. As another example, the first punchout or the second punchout of the visual content may be presented with stitching of at least two portions of the visual content divided within the first hemisphere and the second hemisphere.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates a method for providing punchouts of videos.

FIG. 8 illustrates example viewing windows for a spherical video captured by an image capture device.

DETAILED DESCRIPTION

Figure 1:
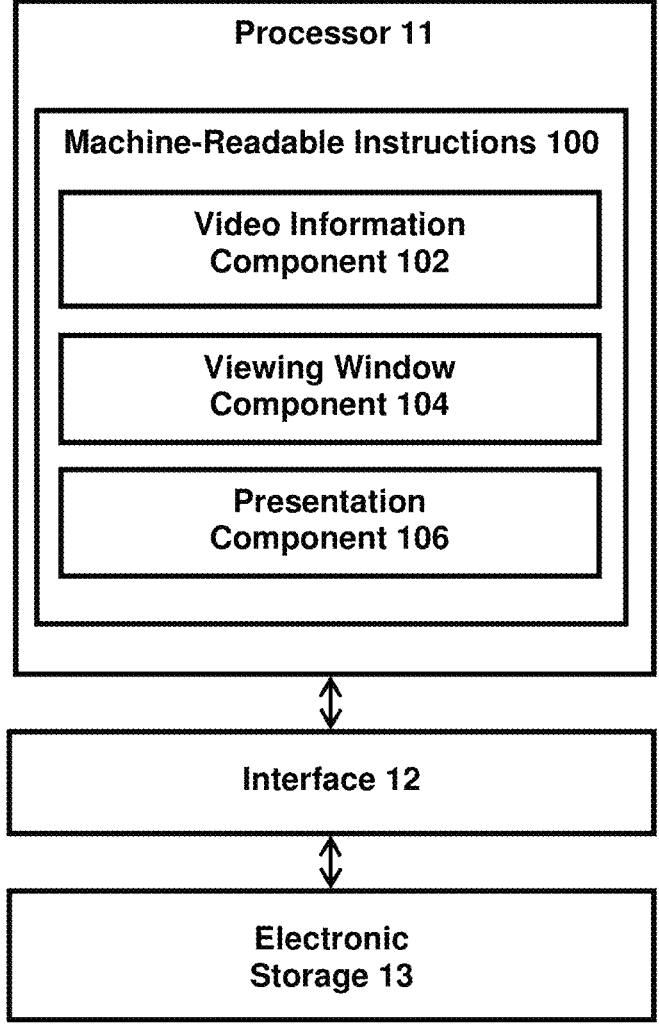
FIG. 1 illustrates a system that provides punchouts of videos.

FIG. 1 illustrates a system 10 for providing punchouts of videos. The system 10 may include one or more of a processor 11, an interface 12 (e.g., bus, connection, wireless interface), an electronic storage 13, and/or other components. Video information defining a video may be obtained by the processor 11. The video may include video content having a progress length. The video content may include visual content viewable as a function of progress through the progress length. The visual content having a field of view. A first viewing window for the visual content may be determined based on a first viewing window criterion and/or other information. A second viewing window for the visual content may be determined based on a second viewing window criterion and/or other information. The first viewing window may define a first set of extents of the visual content, and the second viewing window may define a second set of extents of the visual content. The visual content may be presented on a display based on the first viewing window and the second viewing window. The presentation of the visual content may include a first punchout of the visual content based on the first viewing window and a second punchout of the visual content based on the second viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining videos, information relating to videos, information relating to viewing window criterion, information relating to viewing windows, information relating to punchouts of visual content, information relating to video presentation, and/or other information.

A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. Visual content may be generated based on light received within a field of view of a single image sensor or within fields of view of multiple image sensors during a capture period.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a single location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor (s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content are contemplated. In some implementations, spherical video content may be consumed as virtual reality content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

Figure 3:
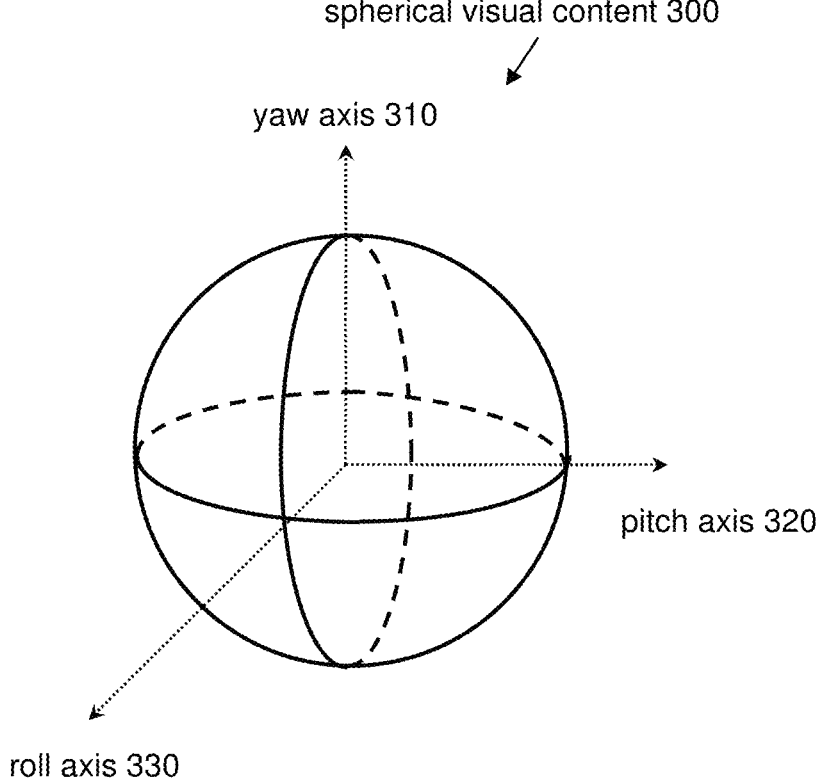
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
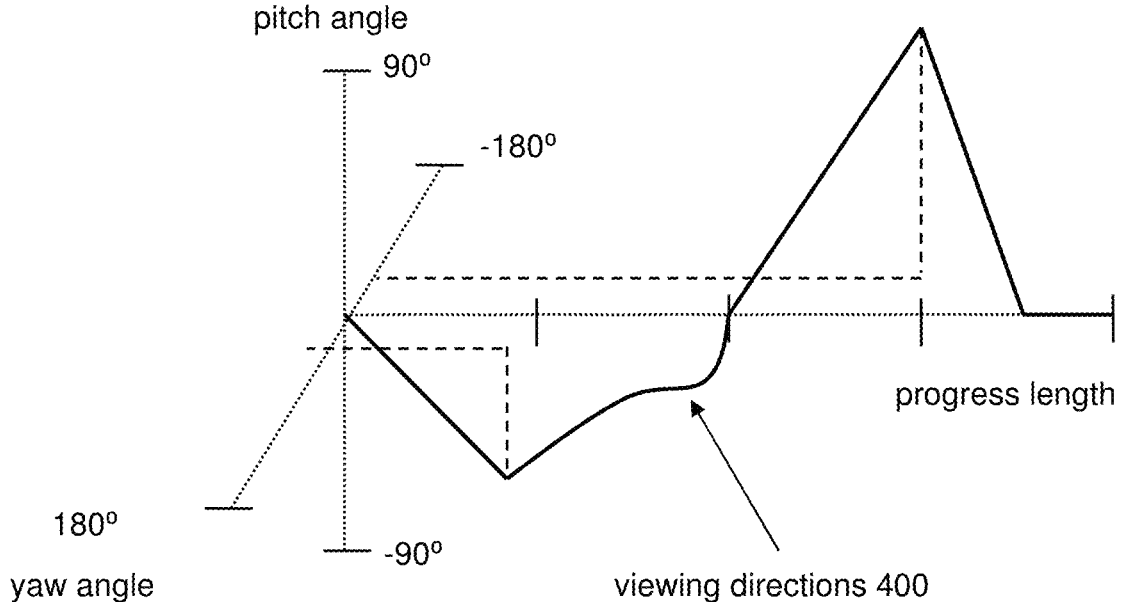
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figure 5:
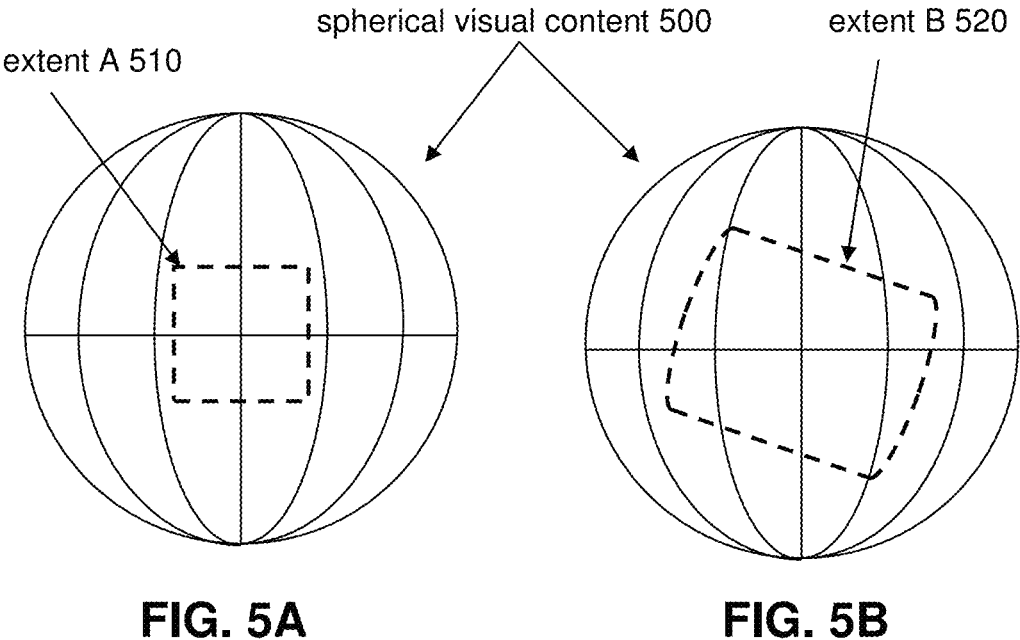
FIGS. 5A-5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate providing punchouts of videos. The machine-readable instructions 100 may include one or more computer program components. The machine-readable instructions 100 may include one or more of a video information component 102, a viewing window component 104, a presentation component 106, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more image sensors, electronic storage of a device accessible via a network, and/or other locations. The video information component 102 may obtain video information from one or more hardware components (e.g., an image sensor) and/or one or more software components (e.g., software running on a computing device).

The video information component 102 may be configured to obtain video information defining a video during acquisition of the video and/or after acquisition of the video by one or more image sensors/image capture devices. For example, the video information component 102 may obtain video information defining a video while the video is being captured by one or more image sensors/image capture devices. The video information component 102 may obtain video information defining a video after the video has been captured and stored in memory (e.g., the electronic storage 13).

In some implementations, the video information may be obtained based on user interaction with a user interface/application (e.g., video editing application), and/or other information. For example, a user interface/application may provide option(s) for a user to select one or more videos from which punchouts are to be provided. The video information defining the video(s) may be obtained based on the user's selection of the video(s) through the user interface/video application.

Video information may define one or more videos (e.g., non-spherical video, spherical video, panoramic video). A video may include video content having a progress length, and the video content may include visual content (defined by video frames) viewable as a function of progress through the progress length. The visual content may have a field of view. A field of view of visual content may refer to an extent of a scene captured within the visual content. A field of view of visual content may refer to a part of a scene from which light is received for generation of the visual content. For example, the video may include a spherical video defining visual content viewable from a point of view as a function of progress through the progress length, and the field of view may of the spherical video may include a spherical field of view (360 degrees of capture). Other fields of view are contemplated.

Video information may be stored within a single file or multiple files. For example, video information defining a video may be stored within a video file, multiple video files, a combination of different files (e.g., a visual file and an audio file), and/or other files. Video information may be stored in one or more formats/container. A format may refer to one or more ways in which the information defining a video is arranged/laid out (e.g., file format). A container may refer to one or more ways in which information defining a video is arranged/laid out in association with other information (e.g., wrapper format).

The viewing window component 104 may be configured to determine multiple viewing windows for the visual content. A viewing window may define extents of the visual content viewable as a function of progress through a progress length. A viewing window may be used to provide a punchout of the visual content. A punchout of the visual content may refer to extents of the visual content that is obtained for viewing and/or extraction. The extents of the visual content of the image viewable within the viewing window may be used to provide views of different spatial portions of the visual content. A punchout of the visual content may include extents (visual portions) of the visual content. For spherical visual content, the viewing window may define extents of the visual content viewable from a point of view. The viewing window may be characterized by viewing directions, viewing sizes (e.g., viewing zoom, viewing magnification), viewing rotations, and/or other information.

A viewing window may be determine based on one or more viewing window criteria and/or other information. A viewing window criterion may refer to one or more standards and/or factors according to which a viewing window is determined. For example, a viewing window criterion may be used to determine one or more of viewing directions, viewing sizes, viewing rotations, and/or other characteristics of a viewing window. A viewing window criterion may be set and/or determined based on one or more of user input, operation mode, system default, and/or other information. For example, a user may select one or more viewing window criteria that will be used to determine the viewing window. The system 10 and/or one or more image capture devices capturing the video may be operating within a certain mode, which may activate one or more viewing window criteria. For example, an image capture device operating in an interview mode to provide an interview view or a selfie-and-motion mode to provide a selfie-and-motion view (described below) may result in one or more corresponding viewing window criteria being used to determine the viewing window. In some implementations, the content captured within the video (e.g., scenery, activity, action, object, emotion) may be identified and one or more viewing window criteria corresponding to the captured content may be suggested for use and/or used to determine the viewing window.

A viewing window criterion may be used to determine one viewing window or multiple viewing windows. The viewing window component 104 may determine a single viewing window or multiple viewing window for the visual content based on one or more viewing window criteria. Different viewing windows may be determined based on the same viewing window criterion or different viewing window criterions.

Figure 6:
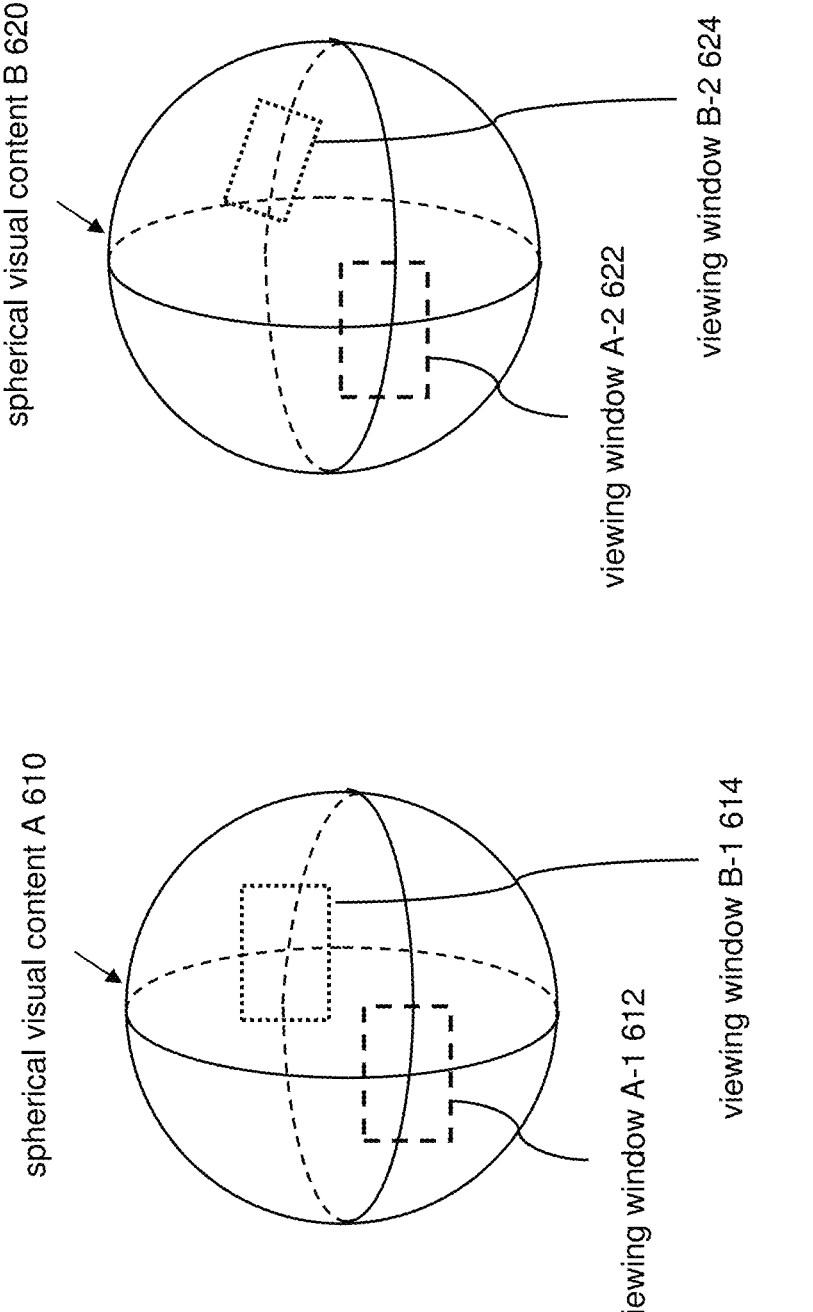
FIG. 6 illustrates example viewing windows for spherical visual content.

For example, FIG. 6 illustrates example viewing windows for spherical visual content. While FIG. 6 illustrates two viewing windows per visual content, this is merely as an example and is not meant to be limiting. The viewing window component 104 may be configured to determine two or more viewing windows for the visual content.

For spherical visual content A 610, the viewing window component 104 may determine a viewing window A-1 612 and a viewing window B-1 614. The viewing window A-1 612 and the viewing window B-1 614 may be determined based on the same viewing window criterion or different viewing window criteria. For example, the viewing window A-1 612 may be determined based on a viewing window criterion and the viewing window B-1 614 may be determined based on a different viewing window criterion. The viewing windows 612, 614 may define sets of extents of the spherical visual content A 610. For example, the viewing window A-1 612 may define a set of extents located at the front of the spherical visual content A 610 and the viewing window B-1 614 may define a set of extents located at the back of the spherical visual content A 610.

For spherical visual content B 620, the viewing window component 104 may determine a viewing window A-2 622 and a viewing window B-2 624. The viewing window A-2 622 and the viewing window B-2 624 may be determined based on the same viewing window criterion or different viewing window criteria. For example, the viewing window A-2 622 may be determined based on a viewing window criterion and the viewing window B-2 624 may be determined based on the same viewing window criterion. The viewing windows 622, 624 may define sets of extents of the spherical visual content B 620. For example, the viewing window A-2 622 may define a set of extents located at the front of the spherical visual content B 620 and the viewing window B-2 624 may define a set of extents located at the back of the spherical visual content B 620. The viewing window B-2 624 may be rotated and located more to the side than the viewing window B-1 614.

In some implementations, the viewing windows may be determined to provide a particular view of the visual content. For example, the viewing window may be determine (and viewing criteria may be selected/used) to provide an interview view of the visual content. An interview view of the visual content may include punchouts of the visual content to show entities speaking with each other, entities speaking at an event, entities gathered at a location, and/or entities otherwise being engaged with each other.

In some implementation, the viewing windows may provide different views of the visual content. For example, the viewing windows may provide an interview view and/or a selfie-and-motion view of the visual content. In some embodiments, a viewing window may be determined based on information associated with another viewing window. For example, the viewing window A-1 612 may include a person. Subject detection may be performed within the viewing window A-1 612 to determine the direction of the person's gaze. The viewing window B-1 614 may be determined to follow the gaze of the person—that is, the viewing window B-1 614 may include a field of view that is in the direction that the person is looking. The viewing window may rotate based on subject detection. For example, the viewing window B-2 624 may be rotated based on a subject detection within the viewing window A-2 622 finding that a person is looking in the direction of the viewing window B-2 624 with the head tilted to the right. Other views of the visual content are contemplated.

An interview view of visual content may include punchouts of the visual content that includes framing(s) of one or more subjects within the visual content. A subject may refer to person or a thing captured within the visual content. An interview view of the visual content may be provided by using one or more subject detection criteria to determine the viewing window. A subject detection criterion may refer to a criterion that is used to include a subject within the viewing window. In some implementations, a subject detection criterion may include standards and/or factors as to how the subject is framed within the viewing window. For example, a subject detection criterion may be used to determine a viewing window that include a particular framing of a subject (e.g., zoomed in on the face, centering face within the viewing window, off-centering face within the viewing window, including one or more portions of the body, position of the body within the viewing window). That is, determination of a viewing window based on a subject detection criterion may include selection of a set of extents of the visual content to include a particular framing of the subject within the corresponding punchout of the visual content.

Figure 7A:
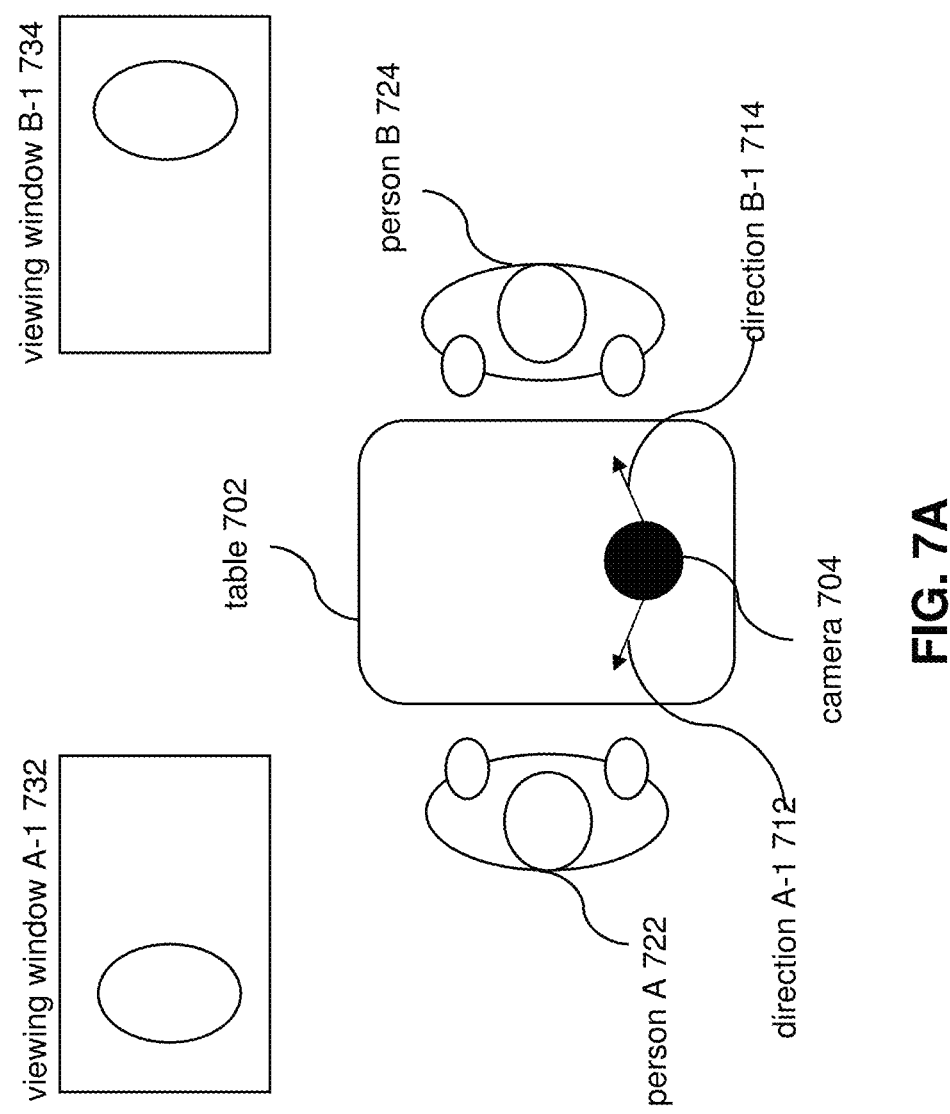
FIGS. 7A-7B illustrate example viewing windows and positioning of persons around an image capture device.
Figure 7B:
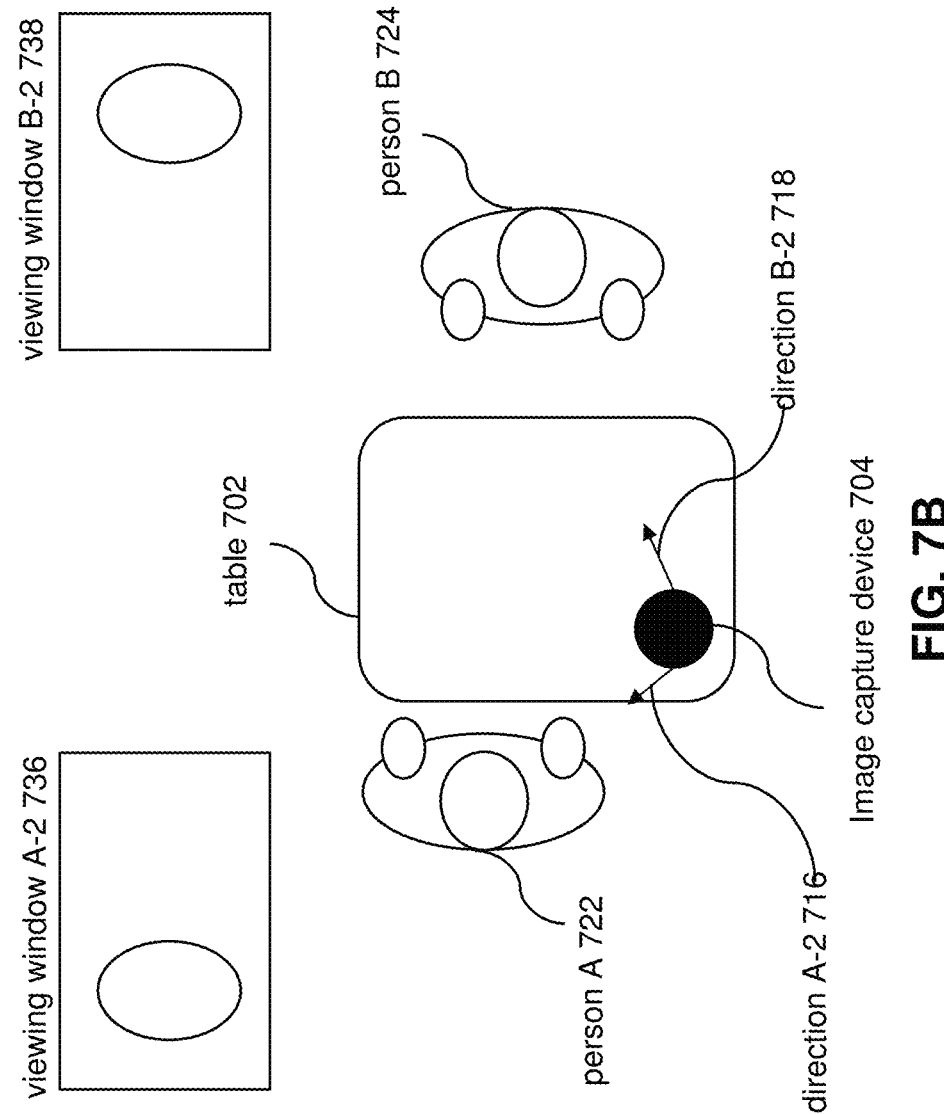

FIGS. 7A-7B illustrate example viewing windows and positioning of persons around an image capture device. In FIG. 7A, a camera 704 may be located on a table 702. A person A 722 may be positioned on the left side of the table 702 and a person B 724 may be positioned on the right side of the table 702. A subject detection criterion may be used to determine a viewing window A-1 732. The viewing window A-1 732 may include a set of extents of spherical visual content captured by the camera 704, with the set of extents located in a direction A-1 712 (viewing direction is pointed in the direction A-1 712). The viewing window A-1 732 may be determined based on the subject detection criterion to include a particular framing of the person A 722 within a punchout of the spherical visual content. For example, the viewing window A-1 732 may be zoomed in on the head of the person A 722, with the head of the person A 722 located in the left portion of the viewing window A-1 732.

A subject detection criterion may be used to determine a viewing window B-1 734. The subject detection criterion used to determine the viewing window B-1 734 may be the same as or different from the subject detection criterion used to determine the viewing window A-1 732. The viewing window B-1 734 may include a set of extents of spherical visual content captured by the camera 704, with the set of extents located in a direction B-1 714 (viewing direction is pointed in the direction B-1 714). The viewing window B-1 734 may be determined based on the subject detection criterion to include a particular framing of the person B 724 within a punchout of the spherical visual content. For example, the viewing window B-1 734 may be zoomed in on the head of the person B 724, with the head of the person B 724 located in the right portion of the viewing window B-1 734.

In some implementations, the framing of the person B 724 may be determined based on the framing of the person A 722, or vice versa, such that the framing of the person B 724 within the viewing window B-1 734 is equivalent to the framing of the person A 722 within the viewing window A-1 732. Such framing of subjects may provide for multiple punchouts of the visual content including the same/similar framing of subjects. A framing of a subject being equivalent to another framing of a subject may include the framings being the same or being similar. For example, framings of subjects being equivalent may include the subjects being positioned within the corresponding viewing windows such that the subjects appear to have been captured from the same distance (the subjects appear to be at same distance from the image capture device) and/or from a same angle (the subjects appear to be at same angle offset with respect to the image capture device). Equivalent framings of subject may include a framing of a subject being mirrored in the framings of other subject(s). Such determination of viewing windows may enable multiple punchouts of the visual content appearing to include multiple subjects captured from the same distance and/or from the same angle. Such determination of viewing windows may enable multiple punchouts of the visual content that follows the 180-degree rule (guideline that subjects in a scene have the same left-right relationship to each other with filming taking place within the 180-degree).

Such framing of subjects within viewing windows/punchouts may enable visual content (e.g., spherical visual content) to be captured without having to take into consideration where subjects are positioned with respect to the image capture device(s). For example, in FIG. 7B, the camera may be moved down to a corner of the table 702. The person A 722 may have move to the left and the person B 724 may have moved away from the table 702. Viewing windows 736, 738 may be determined such that the framing of the person A 722 within a viewing window A-2 736 is equivalent to the framing of the person B 724 in a viewing window B-2 738. The viewing window A-2 736 may be determined based on the viewing direction being pointed in a direction A-2 716 and the viewing window B-2 738 may be determined based on the viewing direction being pointed in a direction B-2 718. These viewing directions 716, 718 may result in the head of the person A 722 being located in the left portion of the viewing window A-2 736 and the head of the person B 724 being located in the right portion of the viewing window B-2 738. The viewing sizes (e.g., zoom) of the viewing windows 736, 738 may be determined (greater zoom being used for the view of the person B 724 than for the view of the person A 722) so that the views of the person A 722 and the person B 724 appear to have been captured from the same distance from the image capture device 704.

A selfie-and-motion view of visual content may include punchouts of the visual content that includes a view of a face captured within the visual content and a view of motion (e.g., forward motion) captured within the visual content. A selfie-and-motion view of the visual content may be provided by using one or more of a face detection criterion and a direction detection criteria to determine the viewing window. A face detection criterion may refer to a criterion that is used to include a face of a person within the viewing window. A face detection criterion may be used to include within the viewing window the closest face to the image capture device(s) during capture of the visual content. A face detection criterion may be used to include within the viewing window the face of the person holding and/or operating the image capture device(s) during capture of the visual content. The face of the relevant person may be determined based on visual analysis of the visual content (e.g., identifying the person holding the image capture device), based on tagging (e.g., a user tagging which person/person's face should be included within the viewing window), and/or other information.

A face detection criterion may specify how the face is to be included within the viewing window (e.g., framing of the face within the viewing window). A face detection criterion may be used to include other parts of the person within the viewing window. Determination of a viewing window based on a face detection criterion may include selection of a set of extents of the visual content to include a face (and other parts) of a person within the corresponding punchout of the visual content.

FIG. 8 illustrates example viewing windows for a spherical video captured by an image capture device 804. A person 802 may be holding and operating the image capture device 804 to capture a spherical video. The person may be on a movement platform, which may be used by the person 802 to move. For example, the movement platform may include a surfing board or a skate board, and the person 802 may be moving forward (in a motion direction 808). A face detection criterion may be used to determine a viewing window B 838. The viewing window B 838 may include a set of extents of spherical visual content of the spherical video captured by the image capture device 804, with the set of extents located in a direction B 818 (viewing direction is pointed in the direction B 818). The viewing window B 838 may be determined based on the face detection criterion to include a particular framing of the face of the person 802 within a punchout of the spherical visual content. For example, the viewing window B 838 may be zoomed in on the head of the person 802, with the head of the person 802 located in the center of the viewing window B 838.

A direction detection criterion may refer to a criterion that is used to include a view of the direction of motion captured within the visual content. Motion of an object may refer to change in location and/or position of the object. Motion may include translational motion and/or rotational motion.

A direction detection criterion may be used to include within the viewing window the portion of the visual content facing the direction of motion. The direction of motion may include a direction of motion of an image capture device capturing the visual content and/or a direction of an object (e.g., person, thing) carrying the image capture device. The direction of motion may be determined based on visual analysis of the visual content (e.g., using optical flow to determine the direction of motion), based on non-image sensor information (e.g., information generated by one or more of an accelerometer, gyroscope, magnetometer, inertial measurement unit, GPS unit), and/or other information. The non-image sensor/motion sensor may be carried within the image capture device and/or the object carrying the image capture device.

A direction detection criterion may specify the amount of field of view to be included within a viewing window (e.g., viewing size of the viewing window). In some implementations, the amount of field of view may be determined based on one or more of user input, system defaults, direction of motion, speed of motion, acceleration of motion, captured scene (e.g., ocean, beach, mountain, road, sky), captured activity (e.g., skiing, surfing, biking), captured action (e.g., going downhill, going uphill, jumping, moving side-to-side, tumbling), and/or other information. Determination of a viewing window based on a direction detection criterion may include selection of a set of extents based on the direction of motion of the image capture device 804 and/or an object carrying the image capture device 804 (the person 802, the movement platform 806) during capture of the visual content. The selection of the set of extents of the visual content based on the direction of motion may include selection of a viewing direction (the direction A 816) for the viewing window A 836 to follow the direction of motion (the motion direction 808).

For example, referring to FIG. 8, the image capture device 804, the person 802, and/or the moving platform 806 may be moving in the motion direction 808. A direction detection criterion may be used to determine a viewing window A 836. The viewing window A 836 may include a set of extents of spherical visual content of the spherical video captured by the image capture device 804, with the set of extents located in a direction A 816 (viewing direction is pointed in the direction A 816), which may be along and/or parallel to the motion direction 808. The extent of the spherical visual content included within the viewing window A 836 (viewing size of the viewing window A 836) may be determined based on the direction detection criterion.

In some implementations, the direction detection criterion may allow for deviation of the viewing window from following the direction of motion. For example, one or more things and/or events of interest may be captured within the spherical video and the direction detection criterion may allow the viewing window to temporarily deviate from the direction of motion to include the things/event(s) of interest within the viewing window. For example, a skier may be operating an image capture device while going down a hill. The image capture device may capture within a video an interesting thing (e.g., a peculiar snowman) and/or an interest event (e.g., a crash/jump by another skier). The viewing window for the video may follow the skier's downhill motion for durations of the video not including thing(s)/event(s) of interest.

The viewing window for the video may deviate from the skier's downhill motion to include the interesting thing/event for durations of the video including the things/event(s) of interest. In some implementations, the viewing window may deviate from the direction of motion when the thing(s)/event(s) of interest captured within the video satisfy a threshold size (e.g., depiction of the thing(s)/event(s) of interest are bigger than a threshold pixel size). The viewing window may return to the direction of motion when the thing(s)/event(s) of interest does not satisfy the threshold size (e.g., depiction of the thing(s)/event(s) of interest get smaller than a threshold pixel size).

In some implementations, visual analysis and/or computer vision techniques may be performed based on the viewing windows. Visual analysis and/or computer vision techniques may be performed within a portion of a video frame (e.g., spherical video frame) within the viewing window. For example, visual analysis/computer vision may be performed within the viewing window to identify classes of subjects/events which are of interest to users, persons, persons in motion, gestures, emotion (e.g., smiling, frowning), animals, objects associated with a given activity (e.g., activity equipment such as a surfing board, activity scene/environment such as a wave), actions (e.g., jumps, dancing), and/or other visuals captured within the video frame.

Localization of the visual analysis/computer vision within the viewing window may provide for resource savings (e.g., computing power, time, memory, power consumption) compared to performing visual analysis/computer vision over the entirety of the video (e.g., entire spherical video frames). In some implementations, the visual analysis/computer vision may be used to determine different amounts of interest levels, certainty of identification, and/or other metrics at various portions (in time and space) within the video.

The presentation component 106 may be configured to present the visual content on one or more displays based on multiple viewing windows and/or other information. For example, the presentation component 106 may present the visual content on one or more displays based on the viewing window A-1 732, the viewing window B-1 734, and/or other information. As another example, the presentation component 106 may present the visual content on one or more displays based on the viewing window A 836, the viewing window B 838, and/or other information. Such presentation of the visual content may include different punchouts of the visual content based on different viewing windows. For example, the presentation of the visual content based on the viewing window A-1 732 and the viewing window B-1 734 may include one punchout of the visual content based on the viewing window A-1 732 and another punchout of the visual content based on the viewing window B-1 734. Individual punchouts of the visual content may include the set of extents (one or more extents) of the visual content defined by corresponding viewing window. For example, the punchout of the visual content based on the viewing window A-1 732 may include the extent(s) of the visual content defined by the viewing window A-1 732 and the punchout of the visual content based on the viewing window B-1 734 may include the extent(s) of the visual defined by the viewing window B-1 734.

In some implementations, multiple punchouts of the visual content may be presented at the same time. For example, punchouts of the visual content based on the viewing window A 836 and the viewing window B 838 may be presented at the same time on a single display or on multiple displays. The simultaneous presentation of multiple punchouts may include the punchouts being presented next to each other (e.g., side-by-side) and/or within each other (e.g., picture-in-picture view), such as shown in FIG. 8.

In some implementations, multiple punchouts of the visual content may be presented at the different times. For example, audio captured with capture of the video by the camera 704 may be analyzed to determine which of the persons 722, 724 are speaking. The presentation component 106 may present the visual content within the viewing window of the person speaking. The presentation component 106 may switch between presentation of the visual content within the viewing window A-1 732 and the viewing window B-1 734 based on which of the persons 722, 724 are speaking. In some embodiments, the presentation of the punchouts of the visual content may switch between different modes of presentation. For example, the presentation component 106 may present some or all of the visual content within the viewing window A-1 732 and the viewing window B-1 734 when both persons 722, 724 are speaking. The presentation component 106 may crop the visual content within the viewing window A-1 732 and the viewing window B-1 734 such that faces of the persons 722, 724 are presented without distortion (e.g., change in aspect ratio) while filling the display screen. The presentation component 106 may present some or all of the visual content within a single viewing window based on which of the persons 722, 724 is speaking.

In some implementations, presentation of the visual content based on the viewing windows may provide stabilization of the visual content. That is, by determining the viewing window based on one or more viewing window criterion, the movement captured within the visual content may be reduced or minimized. For example, referring to FIG. 8, the motion of the person 802, the image capture device 804, and/or the movement platform 806 may cause the image capture device 804 to shake during capture of the visual content. Such shaking may be captured within the visual content of the video, which may make viewing of the video unpleasant. However, because the extent of the visual content included within viewing window A 836 may be changed to keep the viewing window A 836 following the direction of motion and the extent of the visual content included within the viewing window B 838 may be changed to keep the face of the person 802 centered within the viewing window B 838, punchouts of the visual content based on the viewing window A 836 and the viewing window B 838 may show less or no motion caused by the shaking of the image capture device 804.

In some implementations, presentation of the visual content based on the viewing windows may be provided as a "default" view for the video. That is, presentation of a video may include those extents of the visual content of the video within the viewing windows. A user may manually change in which direction one or more viewing windows are directed and/or the size/rotation of the viewing window(s). When a user stops manual change of the viewing window(s), the viewing window(s) may return to the viewing direction (s), viewing size(s), and/or viewing rotation(s) determined based on the viewing window criteria (return to the "default" view).

In some implementations, the presentation of the visual content based on the viewing windows may be stored within one or more videos. That is, the punchouts of a video presented by the presentation component 106 may be stored within one or more video files. In some implementations, information on presenting the visual content based on the viewing window may be stored within one or more files (e.g., director track files). Such information may be used with the video to provide the punchouts of the video based on the viewing windows.

In some implementations, the visual content of a video may be divided into multiple parts. For example, FIG. 8 illustrates two spatial portions of spherical visual content 906. The two spatial portions of the spherical visual content 906 may include visual content A 902 and visual content B 904. The visual content A 902 and the visual content B 904 may individually include a hemisphere capture of visual content. The combination of the visual content A 902 and the visual content B 904 may form the spherical visual content 906. The spherical visual content 906 may be divided into a first hemisphere (the visual content A 902) and a second hemisphere (the visual content B 904) opposite the first hemisphere.

The presentation of the punchouts of the visual content may include stitching of the visual content or may not include stitching of the visual content. For example, a punchout of the spherical visual content 906 based on a viewing window A 912 may include a portion of the spherical visual content 906 within one hemisphere (e.g., the visual content A 902) and a punchout of the spherical visual content 906 based on a viewing window B 914 may include a portion of the spherical visual content 906 within the other hemisphere (e.g., the visual content B 904). These punchouts of the visual content within individual hemispheres may be presented without stitching of the visual content divided within the two hemispheres.

As another example, a punchout of the spherical visual content 906 based on a viewing window C 916 may include a portion of the spherical visual content 906 within one hemisphere (e.g., the visual content A 902) and a portion of the spherical visual content 906 within the other hemisphere (e.g., the visual content B 904). This punchout of the visual content across two hemispheres may be presented with stitching of at least the two portions of the visual content divided within the two hemispheres. Thus, stitching of the visual content may be performed based on need. Stitching of visual content may be process intensive and performing stitching without regards to viewing window may consume more resources than necessary. Instead, the punchouts of visual content may be used to identify those portions of visual content (e.g., images, spherical video frames) that are required to be stitched for punchout presentation. In some implementations, stitching may be performed at lower resolution to create a preview of the punchout presentation.

Figure 9:
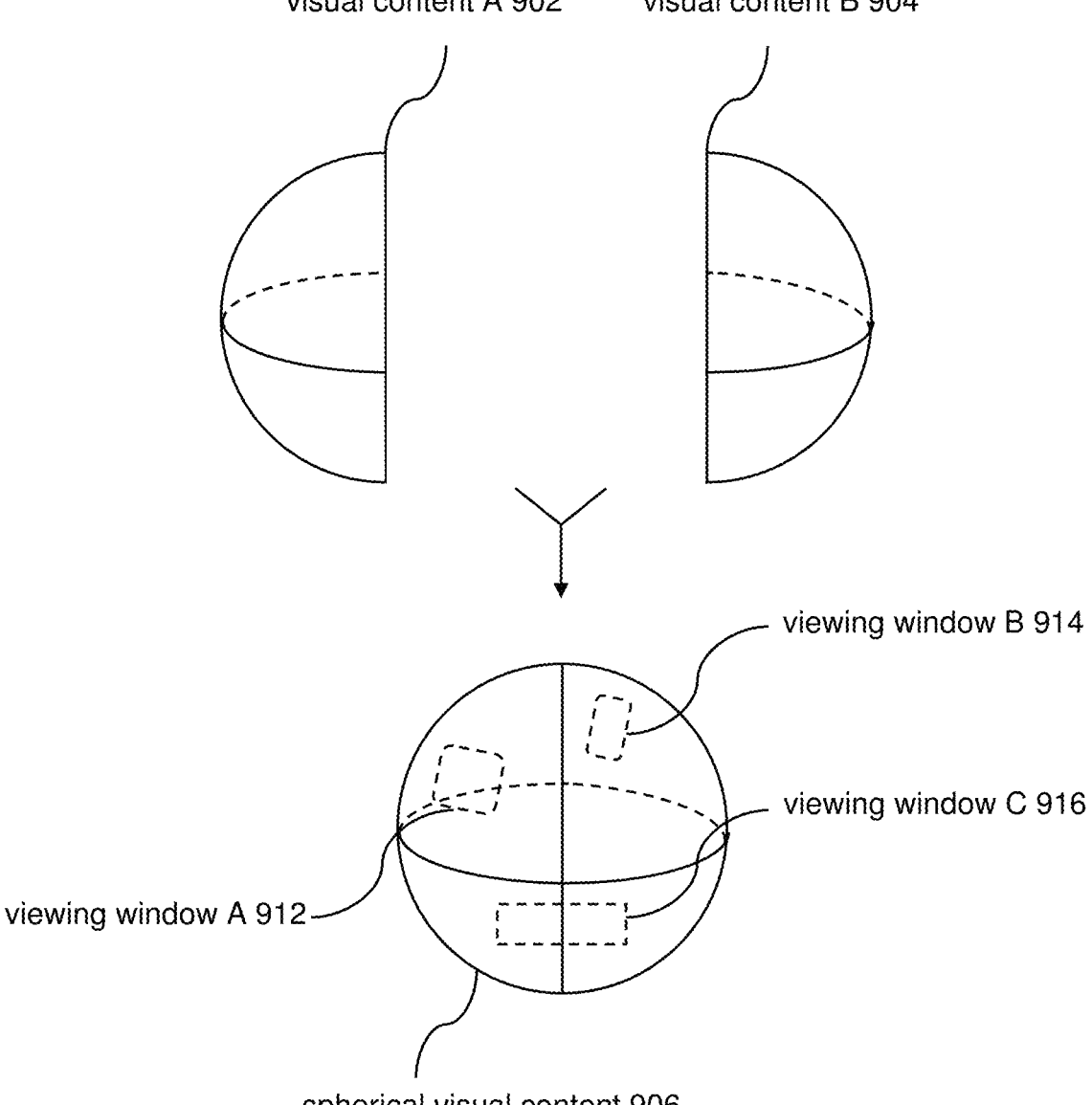
FIG. 9 illustrates spatial portions of spherical visual content.

In some implementations, presentation of the visual content based on a viewing window may include playback of one or more portions of the audio content. The portion(s) of the audio content included in the playback may be selected based on spatiality or directionality of the audio content (e.g., selecting portion of the audio content originating from an audio source within the viewing window) and/or other information. For example, referring to FIG. 9, presentation of the spherical visual content 906 based on the viewing window A 912 may include a portion of the audio content captured with the spherical visual content 906, where the portion of the audio content originated from one or more audio sources within the viewing window A 912.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for providing punchouts of videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, video information defining a video may be obtained. The video may include video content having a progress length. The video content may include visual content viewable as a function of progress through the progress length. The visual content may have a field of view. In some implementation, operation 201 may be performed by a processor component the same as or similar to the video information component 102 (Shown in FIG. 1 and described herein).

At operation 202, a first viewing window for the visual content may be determined based on a first viewing window criterion. The first viewing window may define a first set of extents of the visual content. In some implementations, operation 202 may be performed by a processor component the same as or similar to the viewing window component 104 (Shown in FIG. 1 and described herein).

At operation 203, a second viewing window for the visual content may be determined based on a second viewing window criterion. The second viewing window may define a second set of extents of the visual content. In some implementations, operation 203 may be performed by a processor component the same as or similar to the viewing window component 104 (Shown in FIG. 1 and described herein).

At operation 204, the visual content may be presented on a display based on the first viewing window and the second viewing window. The presentation of the visual content may include a first punchout of the visual content based on the first viewing window and a second punchout of the visual content based on the second viewing window. In some implementations, operation 204 may be performed by a processor component the same as or similar to the presentation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for providing multiple video punchouts, the system comprising:
  one or more physical processors configured by machine-readable instructions to:
    obtain a video, the video including visual content captured by an image capture device;
    determine multiple viewing windows for the visual content to provide different punchouts of spatial extents of the visual content based on multiple criteria, the multiple viewing windows for the visual content enabling presentation of the visual content to include the different punchouts of the spatial extents of the visual content, wherein the multiple viewing windows for the visual content include a first viewing window to provide a first punchout of a first spatial extent of the visual content in a direction of motion of the image capture device during capture of the visual content; and
    store the presentation of the visual content that includes the different punchouts of the spatial extents of the visual content.

2. The system of claim 1, wherein a viewing direction of the first viewing window follows the direction of motion of the image capture device.

3. The system of claim 2, wherein the viewing direction of the first viewing window following the direction of motion of the image capture device includes the viewing direction being along or parallel to the direction of motion of the image capture device.

4. The system of claim 1, wherein the direction of motion of the image capture device includes a direction of forward motion of the image capture device.

5. The system of claim 1, wherein a viewing size of the first viewing window is determined based on user input or a speed of motion of the image capture device.

6. The system of claim 1, wherein the multiple criteria used to determine the multiple viewing windows for the visual content are set based on user input.

7. The system of claim 1, wherein the multiple viewing windows for the visual content further include a second viewing window to provide a second punchout of a second spatial extent of the visual content that includes a face.

8. The system of claim 7, wherein the face included in the second spatial extent of the visual content includes a face closest to the image capture device during capture of the visual content.

9. The system of claim 7, wherein the multiple criteria used to determine the multiple viewing windows for the visual content are set based on operation of the image capture device in a selfie-and-motion mode.

10. A method for providing multiple video punchouts, the method performed by a computing system including one or more processors, the method comprising:
  obtaining, by the computing system, a video, the video including visual content captured by an image capture device;
  determining, by the computing system, multiple viewing windows for the visual content to provide different punchouts of spatial extents of the visual content based on multiple criteria, the multiple viewing windows for the visual content enabling presentation of the visual content to include the different punchouts of the spatial extents of the visual content, wherein the multiple viewing windows for the visual content include a first viewing window to provide a first punchout of a first spatial extent of the visual content in a direction of motion of the image capture device during capture of the visual content; and
  storing, by the computing system, the presentation of the visual content that includes the different punchouts of the spatial extents of the visual content.

11. The method of claim 10, wherein a viewing direction of the first viewing window follows the direction of motion of the image capture device.

12. The method of claim 11, wherein the viewing direction of the first viewing window following the direction of motion of the image capture device includes the viewing direction being along or parallel to the direction of motion of the image capture device.

13. The method of claim 10, wherein the direction of motion of the image capture device includes a direction of forward motion of the image capture device.

14. The method of claim 10, wherein a viewing size of the first viewing window is determined based on user input or a speed of motion of the image capture device.

15. The method of claim 10, wherein the multiple criteria used to determine the multiple viewing windows for the visual content are set based on user input.

16. The method of claim 10, wherein the multiple viewing windows for the visual content further include a second viewing window to provide a second punchout of a second spatial extent of the visual content that includes a face.

17. The method of claim 16, wherein the face included in the second spatial extent of the visual content includes a face closest to the image capture device during capture of the visual content.

18. The method of claim 16, wherein the multiple criteria used to determine the multiple viewing windows for the visual content are set based on operation of the image capture device in a selfie-and-motion mode.

19. A system for providing multiple video punchouts, the system comprising:
  one or more physical processors configured by machine-readable instructions to:
    obtain a video, the video including visual content captured by an image capture device;
    determine multiple viewing windows for the visual content to provide different punchouts of spatial extents of the visual content based on multiple criteria, the multiple criteria including a first criterion and a second criterion different from the first criterion, the multiple viewing windows for the visual content enabling presentation of the visual content to include the different punchouts of the spatial extents of the visual content, wherein the multiple viewing windows for the visual content include a first viewing window to provide a first punchout of a first spatial extent of the visual content in a direction of forward motion of the image capture device during capture of the visual content; and
    store the presentation of the visual content that includes the different punchouts of the spatial extents of the visual content.

20. The system of claim 19, wherein the multiple viewing windows for the visual content further include a second viewing window to provide a second punchout of a second spatial extent of the visual content that includes a face closest to the image capture device during capture of the visual content.

* * * * *